United States Patent [19]
Ueno et al.

[11] Patent Number: 5,481,524
[45] Date of Patent: Jan. 2, 1996

[54] DIFFRACTION ELEMENT AND OPTICAL PICK-UP ASSEMBLY

[75] Inventors: Akira Ueno, Katano; Hideyuki Nakanishi, Kyoto; Hideo Nagai, Takatsuki; Akio Yoshikawa, Ibaraki, all of Japan

[73] Assignee: Matsushita Electronics Company, Osaka, Japan

[21] Appl. No.: 11,311

[22] Filed: Jan. 29, 1993

[30] Foreign Application Priority Data

Jul. 27, 1992 [JP] Japan ................................ 4-199418

[51] Int. Cl.$^6$ .................................................. G11B 7/135
[52] U.S. Cl. ........................................ 369/112; 369/44.23
[58] Field of Search ................................. 369/100, 109, 369/103, 112, 119, 121, 44.17, 44.15, 44.23, 44.37, 44.22, 44.21, 44.18; 359/566, 569, 823, 824; 250/216, 201.5

[56] References Cited

U.S. PATENT DOCUMENTS

| 4,918,300 | 4/1990 | Tsiji et al. | 369/44.37 |
|---|---|---|---|
| 5,136,152 | 8/1992 | Lee | 369/112 |
| 5,231,620 | 7/1993 | Ohuchida | 369/44.14 |

FOREIGN PATENT DOCUMENTS 0309689   4/1989   European Pat. Off. .

OTHER PUBLICATIONS

Patent Abstracts of Japan, vol. 14, No. 398 (P–1097)(4341) Aug. 28, 1990.
Patent Abstracts of Japan, vol. 14, No. 274 (P–1061) Jun. 13, 1990.
Patent Abstracts of Japan, vol. 12, No. 408 (P–778)(3255) Oct. 28, 1988.
Patent Abstracts of Japan, vol. 13, No. 570 (P–977) Dec. 18, 1989.

*Primary Examiner*—Davis L. Willis
*Assistant Examiner*—Don Wong
*Attorney, Agent, or Firm*—Wenderoth, Lind & Ponack

[57] ABSTRACT

A diffraction element includes a diffraction grating for dividing a light beam, emitted from a light source along a predetermined path, into a principal light beam and at least two auxiliary light beams, and a hologram for separating the beam, which has been reflected from an optical information recording medium, from the predetermined path. The diffraction grating and the hologram are integrated together by being formed in alignment with each other in opposite portions of a block of glass or plastics. A slide is provided at at least a portion of the diffraction element and includes a peripheral wall in sliding engagement with a cylindrical surface coaxial with an optical axis of the diffraction element to permit the diffraction element to be rotatable about the optical axis.

9 Claims, 7 Drawing Sheets

DIFFRACTION ELEMENT AND OPTICAL PICK-UP ASSEMBLY

BACKGROUND OF THE INVENTION

1. Field of the Invention

The present invention relates to a diffraction element and an optical pick-up assembly utilizing the diffraction element for recording or reproducing information on or from an optical disc.

2. Description of the Prior Art

An example of prior art optical pick-up assemblies is disclosed in, for example, Japanese Laid-open Patent Publication No. 1-237935, published in 1989. This prior art optical pick-up assembly disclosed therein will now be discussed in detail with reference to FIGS. 23 to 25 which are a schematic perspective view, a side sectional view and a bottom plan view of the prior art optical pick-up device, respectively.

Referring first to FIG. 23, a laser beam 12 emitted from a light source 11 passes through a diffraction element 13 and then through a holographic grating (or a hologram) 16 mounted on the diffraction grating 13 in contact therewith. The laser beam 12 is, as it passes through the diffraction grating 13, divided into a zero-order beam 15a, used for reading pit signals on an optical disc 4 and also for sensing a focus deviation, and a pair of first-order beams 15b and 15c used for sensing a tracking error.

The three beams 15a, 15b and 15c emerging outwardly from the diffraction grating 13 are, after having passed through the holographic grating 16, collimated by a collimator lens-17 and are subsequently passed through an objective lens 18. The collimated beams 15a, 15b and 15c are, as they emerge outwardly from the objective lens 18, converged onto the optical disc 14 so as to form respective light spots 19a, 19b and 19c. At this time, each of the light spots 19b and 19c has become a first-order light spot.

The laser beams so projected onto the optical disc 14 are reflected by an information recording surface of the optical disc 14 so as to travel backwards along the same path through which the laser beams have been projected onto the optical disc 14. The reflected laser beams subsequently enter the holographic grating 16 through the collimator lens 17. The laser beams incident on the holographic grating 16 are, after having been diffracted, received by a light receiving element 10', for example, a photodetector, which detects a focus error signal, according to a wedge-prism method, and both of a tracking error signal and an RF signal, represented by pit signals on the optical disc 14, according to a three-beam method.

As shown in FIGS. 24 and 25, the light source 11 and the light receiving element 10' are fixedly mounted on a support disc 20 in a spaced relationship with each other. The support disc 20 has a lower portion forming a radially outwardly protruding flange 20a onto which a lower end of an inner cylindrical barrel 21 is fixedly mounted. The inner cylindrical barrel 21 has an upper end portion remote from the support disc 20 which forms a radially inwardly protruding mount 21a. An assembly of the holographic grating 16 positioned on the diffraction grating 13 in contact therewith is fixedly supported by the mount 21a in a concentric relationship with the light source 11 on the support disc 20.

An assembly of the inner cylindrical barrel 21 together with the diffraction grating 13, the holographic grating 16 and the support disc 20 having the light source 11 and the light receiving element 10' mounted thereon is hereinafter referred to as a projector-sensor module 22. The projector-sensor module 22 referred to above is housed within an outer barrel 23 which will now be described.

The outer barrel 23 has an upper to integral end forming a radially outwardly protruding flange 23a and also has a lower end forming a circumferential row of a plurality of internally threaded holes $23b_1$ and $13b_2$ each extending inwardly from an annular end face of the bar in a direction parallel to the longitudinal axis of the outer barrel 23. This outer barrel 23 has an internal cavity including a reduced diameter portion adjacent the upper end thereof and a large diameter portion 23d adjacent the lower end thereof. The reduced diameter portion of the internal cavity of the outer barrel 23 defines a lens mount 23c for the support of the collimator lens 17 in alignment with an optical path L through which the laser beam travels, whereas the large diameter portion 23d has an inner diameter greater than the outer diameter of the inner cylindrical barrel 21.

A lower end of the internal cavity of the outer barrel 23 opening downwardly as viewed in FIG. 25 is radially outwardly enlarged at 23e to a diameter substantially equal to the diameter of the radially outwardly protruding flange 20a of the support disc 20. The projector-sensor module 22 is housed within the large diameter portion 23d with the radially outwardly protruding flange 20 seated within the radially outwardly enlarged portion 23e. It is to be noted that the radially outwardly enlarged portion 23e is delimited by an annular shoulder $23e_1$ and a side wall $23e_2$ lying perpendicular to the annular shoulder $23e_1$.

The projector-sensor module 22 so housed within the outer barrel 23 is fixed in position by means of a generally rectangular leaf spring 24 of a configuration which will now be described.

The generally rectangular leaf spring 24 has an intermediate portion 24a which is depressed relative to the opposite ends thereof. This intermediate portion 24a of the leaf spring 24 is of a length sufficient to accommodate therein the maximum diameter of the support disc 20, that is, the diameter of the radially protruding flange 20a and has a rectangular opening 24d defined therein for facilitating the passage therethrough of electric connection lines led from the light receiving element 10'. The opposite ends 24b of the leaf spring 24 has respective holes $24c_1$ and $24c_2$ defined therein for receiving associated set screws S therethrough as will be described later.

This leaf spring 24 is firmly secured to the lower end of the outer barrel 23 with the set screws S passing through the holes $24c_1$ and $24c_2$ and then threaded into the internally threaded holes $23b_1$ and $23b_2$, respectively. At this time, the projector-sensor module 22 is housed within the large diameter portion 23d of the cavity in the outer barrel 23 with the radially outwardly protruding flange 20a of the support disc 20 clamped movably between the annular shoulder $23e_1$ and the intermediate portion 24a of the leaf spring 24 while the leaf spring 24 extends diametrically across the support disc 20 as best shown in FIG. 24.

The support disc 20 forming a part of the projector-sensor module 22 housed within the large diameter portion 23d of the cavity in the outer barrel 23 can be turned about its center together with the inner barrel 21 by applying an external turning force to a portion of the radially outwardly protruding flange 20a exposed to the outside. At this time, an outer peripheral wall of the radially outwardly protruding flange 20a integral with the support disc 20 is slidably guided by the side wall 23e₂ defining a part of the radially outwardly enlarged portion 23e of the cavity in the outer barrel 23.

It is to be noted that, in this prior art optical pick-up assembly shown in FIGS. 24 and 25, the light source 11 is fixedly mounted on the support disc 20 at a position exactly aligned with the axis of rotation of the projector-sensor module 22 represented by the axis of rotation of the support disc 20 and, hence, that of the inner barrel 21, which is in turn aligned with the optical path L through which the laser beam travels.

Mounted atop the outer barrel 23 and carrying the objective lens 18 in alignment with the optical path L is a lens carrier 25. This lens carrier 25 is drivingly coupled with any known lens drive mechanism so that the objective lens 18 can be axially moved towards and away from the optical disc 14 for focusing the laser beam projected onto the optical disc 14.

Thus, it is clear that, as discussed in connection with the optical system shown in FIG. 23, the laser beam emitted from the light source 11 travels along the optical path L so as to be projected onto the optical disc 14 through the diffraction grating 13, the holographic grating 16, the collimator lens 17 and the objective lens 18 to thereby form the three light spots 19a, 19b and 19c on the optical disc 14. It is also clear that the laser beam once projected onto and subsequently reflected from the optical disc 14 travels again along the optical path L past the objective lens 18, the collimator lens 17 and the holographic grating 16 and is then received by the light receiving element 10' after having been diffracted by the holographic grating 16.

The adjustment of the tracking signal can be accomplished if the projector-sensor module 22 is turned about the longitudinal axis of the inner barrel 21 which is in turn aligned with the optical path L. The turning of the projector-sensor module 22 results in a corresponding turning of the diffraction grating 13 together with the inner barrel 21 and, therefore, the first-order light beams 15b and 15c used to detect the tracking error, that is, the light spots 19b and 19c on the optical disc 14, undergo angular movement about the light spot 19a. By so doing, the respective positions of the light spots 19b and 19c projected onto the optical disc 14 are adjusted and, consequently, tracking error signals outputted from the light receiving element 10' are adjusted.

As discussed in detail hereinabove, the prior art optical pick-up assembly is carefully assembled so that, in order to avoid an optical misalignment of various component parts at the time of adjustment of the tracking error signal, the light source, the light receiving element and the diffraction grating are integrated together with the inner barrel to form the projector-sensor module. In order to effectively avoid the possible optical misalignment, the various component parts such as the light source, the light receiving element and the diffraction grating are required to be precisely and accurately positioned relative to the longitudinal axis of the inner barrel.

More specifically, according to the prior art optical pick-up assembly, not only must the position of the light source be carefully chosen so as to align with the longitudinal axis of the inner barrel precisely and accurately, but any one of the light receiving element and the diffraction grating must also carefully be positioned at required respective locations relative to the carefully chosen position of the light source, requiring a complicated and time-consuming procedure.

SUMMARY OF THE INVENTION

The present invention has been devised with a view focused on the foregoing problems inherent in the prior art optical pick-up assembly and is intended to provide an improved diffraction element and an improved optical pick-up assembly utilizing the improved diffraction element, which are easy to manufacture and assembly and which are substantially free from any possible optical misalignment.

To this end, the present invention is such that the diffraction grating and the hologram are integrally or respectively formed in a one-piece block of glass or plastics to provide a unitary diffraction element (hereinafter referred to as a diffraction element A), at least a portion of the diffraction element A having a slide (a portion capable of being rotated) including a peripheral wall which is slidingly engaged with a cylindrical surface coaxial with an optical axis of the diffraction element A. Alternatively, the diffraction element A and an outer frame made of plastics are formed separately and are subsequently integrated together to provide a unitary diffraction element (hereinafter referred to as a diffraction element B), at least a portion of the diffraction element B having a slide including a peripheral wall which is engaged with a cylindrical surface coaxial with an optical axis of the diffraction element B.

According to the present invention, since the slide, the diffraction grating and the hologram are integrated together so as to satisfy positioning requirements, the slide, the diffraction grating and the holograms can be accurately and precisely positioned relative to each other.

Preferably, the slide may the form a projection, a recess or a portion of a combination of the projection and the recess. In such cases, since the strain transmitted to the slide can be absorbed by the projection, the recessed portion or the portion of the combination of the projection and the recess, there is no possibility of aberrations increasing which would otherwise occur if the strain were to act on the diffraction grating and the hologram.

The diffraction element A in which the diffraction grating and the hologram are integrated is integrated together with the plastic outer frame to provide the diffraction element B.

As to the accuracy to which the diffraction element A and the outer frame are positioned relative to each other depends, since the outer frame is made of plastics, the formation of a portion of the outer frame in which the diffraction element A is accommodated can be precisely formed depending on the precision to which a molding die is formed.

Because of the foregoing, regardless of whether the slide is defined in the diffraction element A or whether the slide is defined in the outer frame, the slide, the diffraction grating and the hologram can be accurately and precisely positioned relative to each other. Also, even when the diffraction element A is made of glass, the size of the diffraction element A can advantageously be reduced, thereby reducing the cost required to manufacture the diffraction element A.

Alternatively, the slide of the diffraction element B may form a portion of the projection, the recess or a combination of the projection and the recess. Even in this case, the previously discussed advantages can equally be obtained.

The present invention also provides an optical pickup assembly employing one of the diffraction elements A and B. In this optical pick-up assembly, the optical pick-up assembly can be assembled merely by positioning either one of the diffraction elements A and B relative to an optical unit including a light source and a light receiving element positioned in the vicinity of the light source.

By forming a hole in a carrier for holding an objective lens, causing the slide of the diffraction element to slidably engage a peripheral wall defining the hole, and then by rotating the optical unit, an adjustment of the tracking error signal can be accomplished.

BRIEF DESCRIPTION OF THE DRAWINGS

These and other objects and features of the present invention will become clear from the following description taken in conjunction with preferred embodiments thereof with reference to the accompanying drawings, in which.

DETAILED DESCRIPTION OF THE PREFERRED EMBODIMENTS

Figure 2:
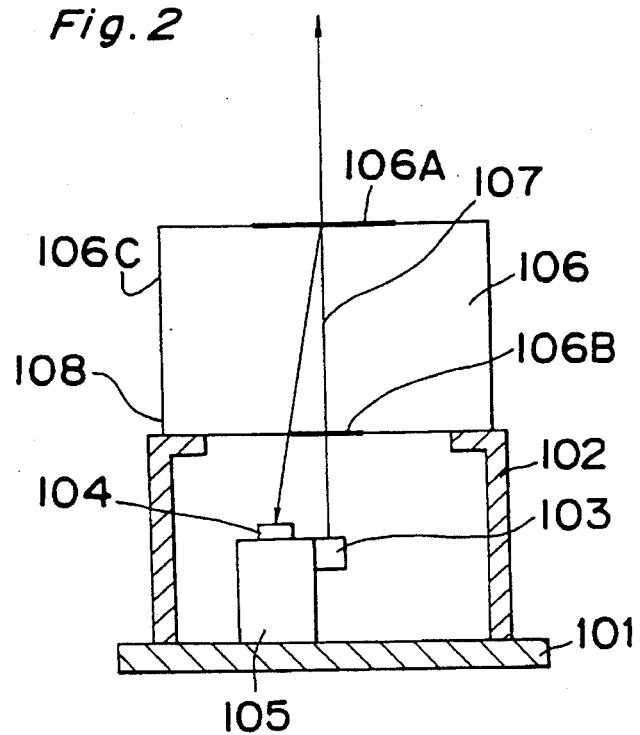
FIG. 2 is a schematic sectional view, on an enlarged scale, of a portion of the optical pick-up assembly shown in FIG. 1, showing the relationship in position of a diffraction element, a light source and a light receiving element employed therein.

Referring first to FIG. 2 for the description of an optical pick-up assembly according to a first preferred embodiment of the present invention, a light source 103 and a light receiving element 104 are rigidly mounted on a base 105 which is in turn rigidly mounted on a support disc 101. The support disc 101 has a generally cylindrical covering 102 mounted thereon so as to enclose the base 105 carrying the light source 103 and the light receiving element 104. A diffraction element 106 is rigidly mounted atop the cylindrical covering 102. This diffraction element 106 is in the form of a generally cylindrical unitary block of glass or plastics integrally formed with a diffraction grating 106B on a lower surface thereof and also with a hologram 106A on an upper surface thereof in alignment with the diffraction grating 106B. The diffraction grating 106B and the hologram 106A, formed on the first and second, for example, lower and upper surfaces, of the diffraction element 106 have their respective centers aligned with each other and also with the longitudinal axis of the diffraction element 106 during the formation of the unitary block of glass or plastics with the use of mating dies.

Figure 3:
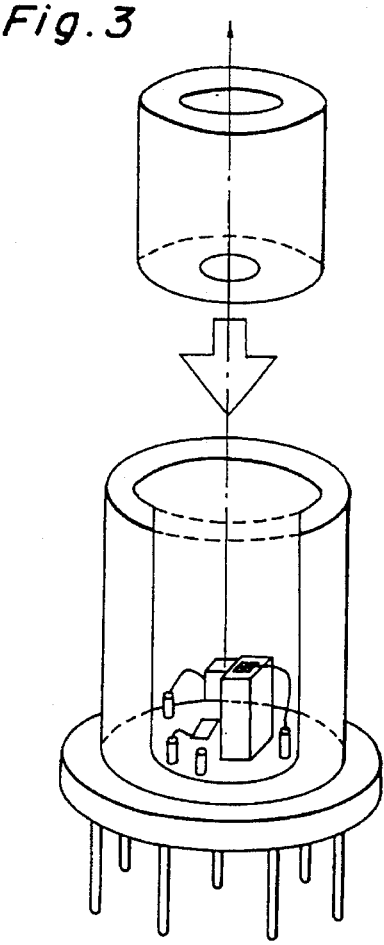
FIG. 3 is a schematic perspective view of the optical pick-up assembly showing the manner in which a covering is mounted so as to cover the diffraction element, the light source and the light receiving element.
Figure 4:
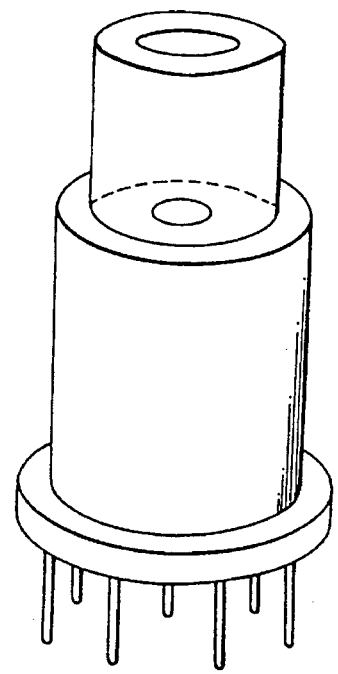
FIG. 4 is a schematic perspective view of an optical unit including the first preferred embodiment of the optical pick-up assembly according to the present invention, showing an outer appearance thereof.
Figure 5:
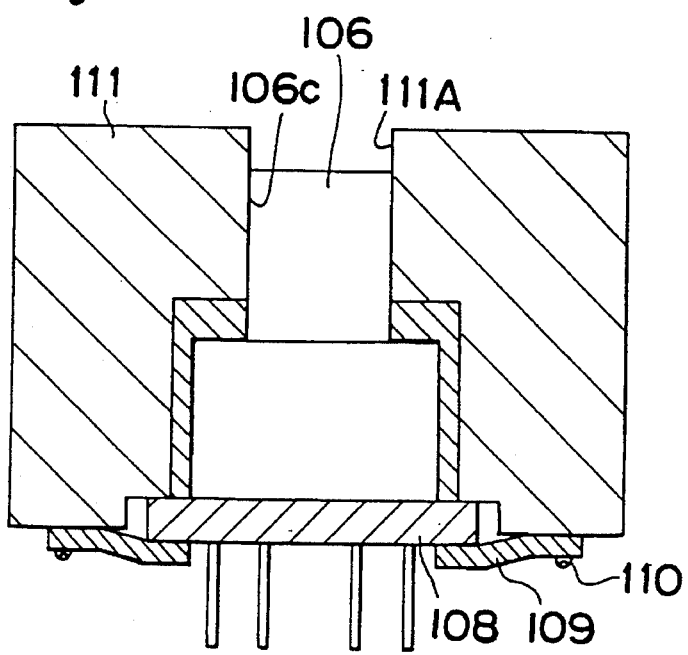
FIG. 5 is a schematic side sectional view of the optical unit assembled together with an objective lens carrier.

The diffraction element 106 is mounted on the cylindrical covering 102 with its longitudinal axis aligned, as shown in FIG. 3, with an optical path 107 along which a beam of light from the light source 103 travels towards an optical disc 113, thereby constituting an optical unit (projector-sensor module) generally identified by reference number 108 and as shown in FIG. 4. A condition in which the optical unit 108 is incorporated in a carrier 111 for carrying an objective lens drive device (not shown) and others is shown in FIG. 5.

The optical unit 108 and the carrier 111 are positioned relative to each other by inserting the diffraction element 106 into a bearing hole 111A in the carrier with an outer peripheral wall 106C of the diffraction element 106 held in contact with an inner peripheral wall of the carrier 111 defining the hole 111A.

The fixing of the optical unit 108 relative to the carrier 111 is accomplished by means of a fixture plate 109 secured from below to the carrier 111 through set screws 110 while a peripheral portion of the support disc 101 is held in abutment with the carrier 111 with the cylindrical covering 102 positioned inside the carrier 111.

Figure 1:
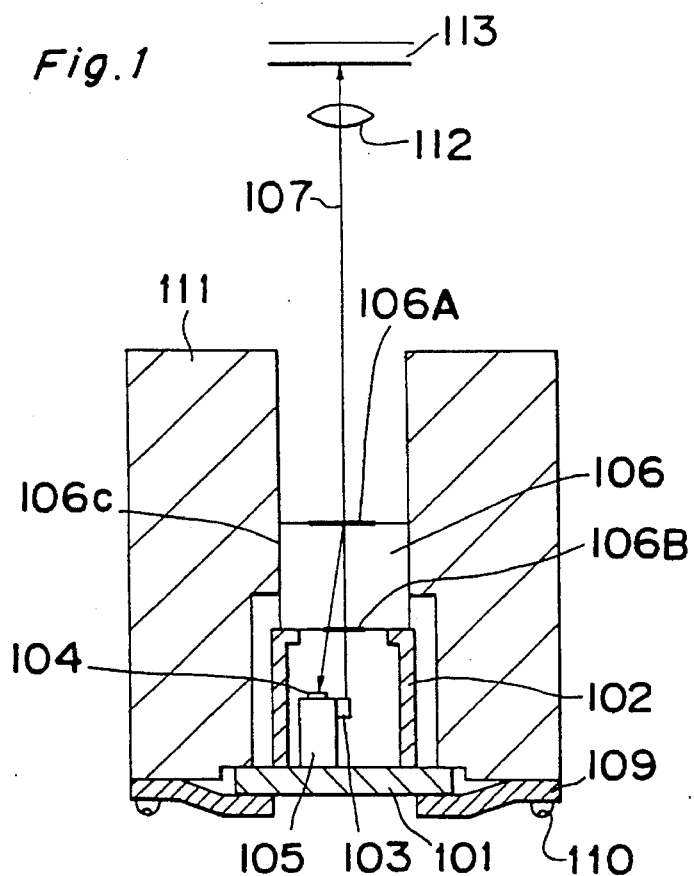
FIG. 1 is a schematic sectional view of a first preferred embodiment of an optical pick-up assembly according to the present invention.

An optical system utilizing the optical unit 108 will now be described with particular reference to FIG. 1. A laser beam emitted from the light source 103 travels along the optical path 107 towards the optical disc 113. More specifically, the laser beam from the light source 103 passes through the diffraction element 106 and then an objective lens 112 and is finally converged on the optical disc 113. As the laser beam from the light source 103 passes through the diffraction grating 106B, the laser beam is divided into a zero-order light beam used for reading information from the optical disc 113 and also for the detection of a deviation of focus and ± first-order light beams used to detect a tracking error.

The laser beam projected onto the optical disc 113 is subsequently reflected therefrom so as to travel along the same optical path as that through which the laser beam has been projected onto the optical disc 113, and subsequently enters the hologram 106A. The reflected laser beam entering the hologram 106A is diffracted by the hologram 106A so as to be incident on the light receiving element 104. While various error detecting methods are well known to those skilled in the art, the present invention makes use of the wedge prism method and the three-beam method to detect the focusing error and the tracking error, respectively.

The tracking error signal is affected by the relationship in position between a row of pits on the optical disc 113 and the spots of the respective ± first-order light beams produced as a result of the passage of the laser beam through the diffraction grating 106B.

Figure 6:
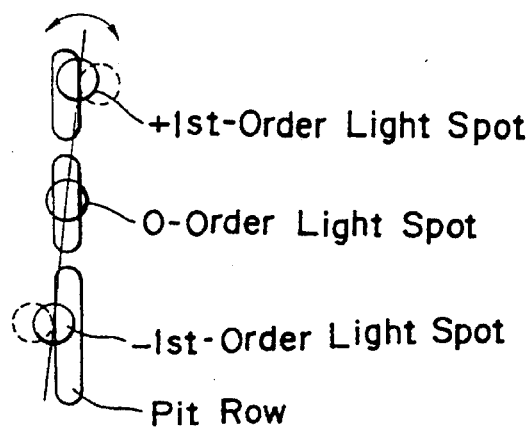
FIG. 6 is a schematic diagram showing the relationship between light spots, formed on the optical disc by means of the optical pick-up assembly according to the present invention, and a row of pits formed on the optical disc.

The ± first-order light spots formed on the optical disc 113 are located on respective sides of the zero-order light spot, also formed on the optical disc 113, and spaced an equal distance from the zero-order light spot as shown in FIG. 6. In other words, the ± first-order light spots occupy respective positions which are in rotational symmetry with respect to the position of the zero-order light spot on the optical disc 113. Accordingly, an adjustment of the tracking error signal can be accomplished by turning the diffraction grating 106B about the optical path 107. According to the present invention, this can be accomplished by turning the diffraction element 106 within the carrier 111 so as to cause the outer peripheral wall 106C of the diffraction element 106 to slide along the inner peripheral wall defining the hole 111A in the carrier 111.

Although the rotation of the diffraction element 106 effected in the manner described above is accompanied by a corresponding rotation of the light source 103 and the hologram 106A, no axial misalignment occur since the axis of rotation of any one of the diffraction element 106, the light source 103 and the hologram 106A is aligned with the longitudinal axis of the diffraction element 106.

According to the present invention, because the diffraction element 106 has the hologram 106A and the diffraction grating 106B formed on the lower and upper surfaces of a one-piece block as axially aligned with each other by the use of an integral molding technique, all that is required when the optical unit 108 is desired to be completed is to align the diffraction element 106 with the light source. Therefore, it is clear that the optical unit, capable of accomplishing the tracking adjustment according to the three-beam method, can easily be assembled.

Figure 7:
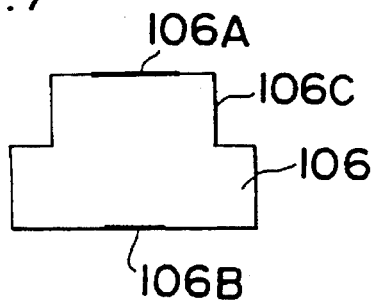
FIG. 7 is a schematic side view of a diffraction element.

It is to be noted that, although the diffraction element 106 has been described as having a cylindrical shape with the outer peripheral wall 106C serving as a slide, the diffraction element 106 may have a lower end portion radially outwardly enlarged as shown in FIG. 7 with an outer peripheral wall of the radially outwardly enlarged body serving as the slide.

Figure 8:
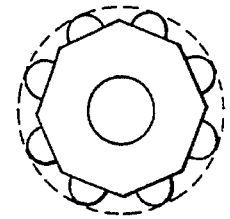
FIG. 8 is a schematic top plan view of the diffraction element shown in FIG. 7.
Figure 9:
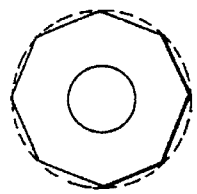
FIG. 9 is a view similar to FIG. 8, showing a modified shape of the diffraction element.
Figure 10:
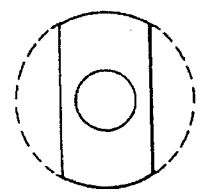
FIG. 10 is a view similar to FIG. 8, showing another modified shape of the diffraction element.

Also, the diffraction element 106 may not be cylindrical and may have a polygonal cross section as shown in FIG. 9 with apexes internally touching a common imaginary circle. Alteratively, the diffraction element 106 may have a polygonal cross section having its outer peripheral wall formed with a plurality of circumferentially spaced projections serving as the slide as shown in FIG. 8. Furthermore, as shown in FIG. 10, the diffraction element 106 may be in the form of a generally rectangular cubic body having its opposite sides rounded so as to occupy respective portions of a common imaginary circle. It is to be noted that of the particular shapes of the diffraction element 106 shown in FIGS. 7–10 may be used in any of preferred embodiments of the present invention which will subsequently be described.

Figure 11:
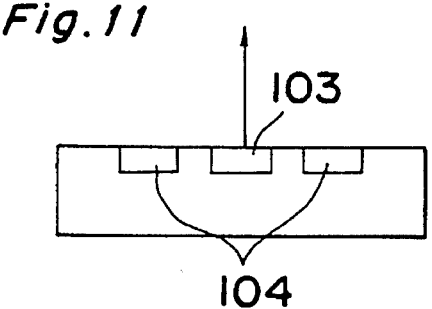
FIGS. 11 and 12 illustrate different examples of the optical unit, respectively.
Figure 12:
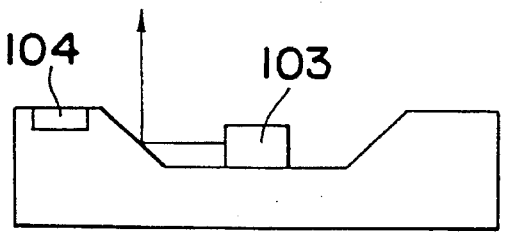

Again, it is to be noted that, while in the optical unit 108 according to the foregoing embodiment of the present invention the light source 103 and the light receiving element 104 have been described as individually mounted on the base 105, a monolithic element in which the light source 103 and the light receiving element 104 are integrated together with the base 105 as shown in FIG. 11 or in which the light source 103 is mounted on the base 105 as shown in FIG. 12 may be employed. According to the modified versions shown in FIGS. 11 and 12, the positioning of the diffraction element 106 relative to one or both of the light receiving element 104 and the light source 103 can easily and accurately be accomplished, and can be applied to the following embodiments of the present invention which will subsequently be described.

In the foregoing description of the first embodiment of the present invention, the hologram 106A and the diffraction grating 106B have been described as integrally molded with the use of molding dies. However, a photolithographic etching technique used in a semiconductor process may be used to form the hologram 106A and the diffraction grating 106B. In this case, the positioning of both the hologram 6A and diffraction grating 6B highly precise according to the precision required in the photolithographic method. This technique may be applied to the following embodiments of the present invention.

Figure 13:
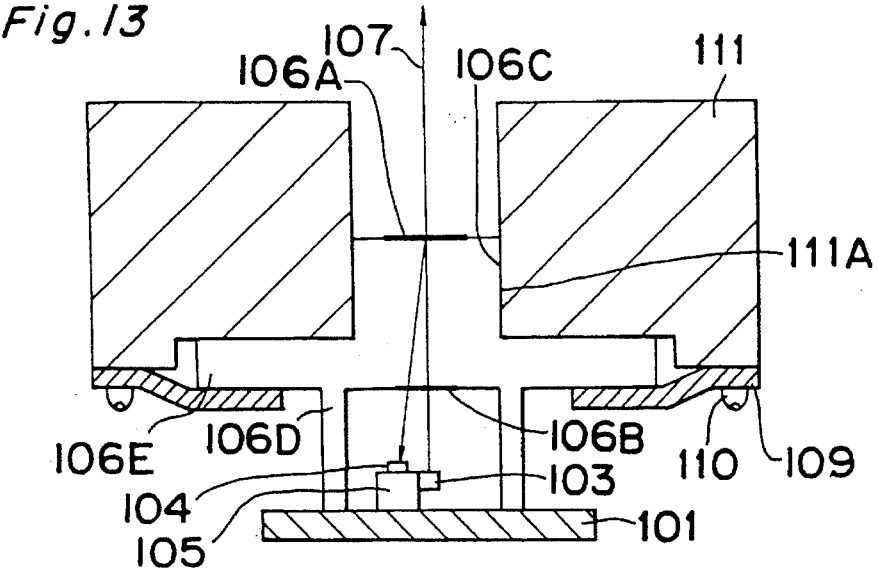
FIGS. 13 and 14 are schematic sectional views of second and third preferred embodiments of the optical pick-up assembly according to the present invention, respectively.

A second preferred embodiment of the present invention will now be described with reference to FIG. 13. As shown in FIG. 13, the light source 103 and the light receiving element 104 are fixedly mounted on the base 105 which is in turn fixedly mounted on the support disc 101. The diffraction grating 106B and the hologram 106A are integrated in a unitary block of glass or plastics together with a covering 106D for enclosing both the light source 103 and the light receiving element 104 and also with a fitting collar 106E for engagement with the carrier 111. In other words, the unitary block is of a shape having a main body defining upper and lower surfaces on which the diffraction grating 106B and the hologram 106A are formed in alignment with each other, respectively, and having the fitting collar 106E protruding radially outwardly therefrom and the covering 106D protruding axially downwardly therefrom in a direction away from the diffraction grating 106B.

The diffraction grating 106B and the hologram 106A formed on the lower and upper surfaces of the diffraction element 106 have their respective centers aligned with each other and also with the longitudinal axis of the diffraction element 106 during the formation of the unitary block of glass or plastics with the use of mating dies.

The diffraction element 106 is mounted on the support disc 101 with the covering 106D resting atop the support disc 101 while enclosing the light source 103 and the light receiving element 104 therein and also with its longitudinal axis aligned with the optical path 107 along which a beam of light from the light source 103 travels towards the optical disc, thereby constituting an optical unit 108.

The optical unit 108 and the carrier 111 are positioned relative to each other by inserting of the diffraction element 106 into the bearing hole 111A in the carrier 111 with an outer peripheral wall 106C of the diffraction element 106 held in contact with an inner peripheral wall of the carrier 111 defining the hole 111A.

The fixing of the optical unit 108 relative to the carrier 111 is accomplished by means of a fixture plate 109 secured from below to the carrier 111 through set screws 110 while the radially outwardly extending collar 106E is held in abutment with the carrier 111. The fixture plate 109 may be an annular plate or may comprise a plurality of leaf springs.

The optical system employed in the optical pick-up assembly according to the second preferred embodiment of the present invention is structured and operable in a manner substantially similar to that described in connection with the first preferred embodiment thereof and, therefore, the adjustment of the tracking error signal can also be accomplished in a manner similar to that accomplished by the first preferred embodiment. However, in the second preferred embodiment of the present invention, the covering used to enclose the light source and the light receiving element is integrally formed with the diffraction element and, therefore, the number of necessary component parts employed can be minimized advantageously.

Figure 14:
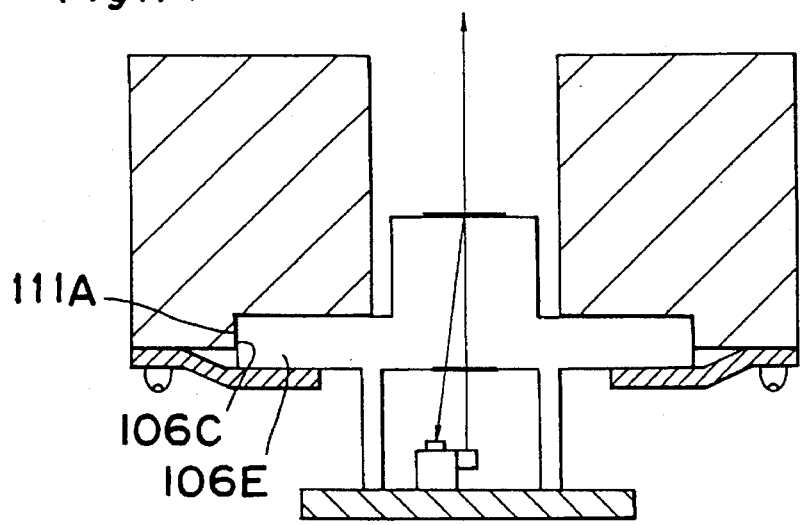

FIG. 14 illustrates a longitudinal sectional view of the optical pick-up assembly according to a third preferred embodiment of the present invention. The optical pick-up assembly shown therein differs from that shown in FIG. 13 in that a cylindrical will 106C is provided at the outer periphery of the radially outwardly protruding collar 106E of the diffraction element 106.

According to the third preferred embodiment of the present invention, in the event that a strain is induced in the diffraction element at the time of rotation or fixing of the element, this strain can be absorbed only by the collar, thereby eliminating a transmission of the strain to any one of the diffraction grating and the hologram. Therefore, there is no possibility that aberrations may be increased.

Figure 15:
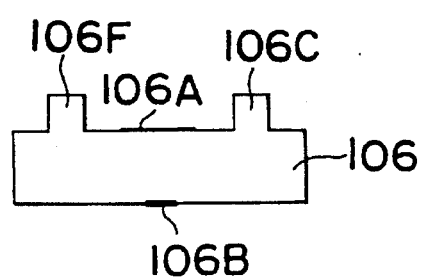
FIGS. 15 to 20 are schematic side views of different examples of the diffraction element, respectively.
Figure 16:
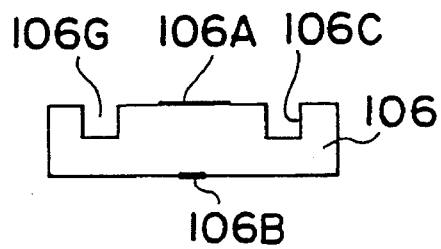
Figure 17:
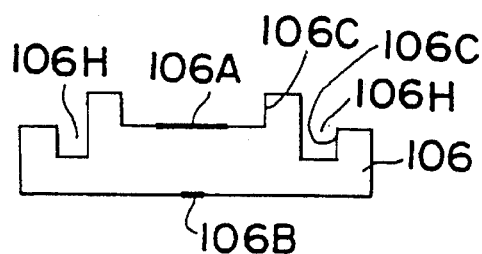

The elimination of any possible transmission of the strain to that portion (body) of the diffraction having the hologram and diffraction grating during the rotation can also be accomplished by any means other than the provision of the cylindrical outer peripheral wall of the collar of the diffraction element 106. For example, an axially outwardly protruding projection 106F may be formed with a peripheral wall as shown in FIG. 15, or an axially inwardly extending groove 106G may be formed at the peripheral portion of the diffraction element 106 as shown in FIG. 16. Also, as shown in FIG. 17, an axially inwardly extending groove 106H and an axially outwardly protruding projection positioned radially inwardly of the axially inwardly extending groove 206H may be formed at the peripheral portion of the diffraction element 106.

Figure 18:
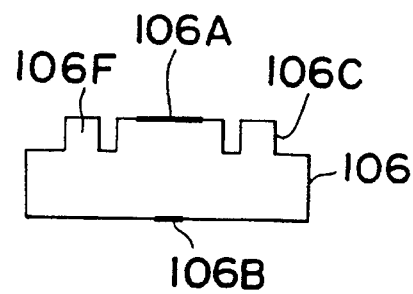
Figure 19:
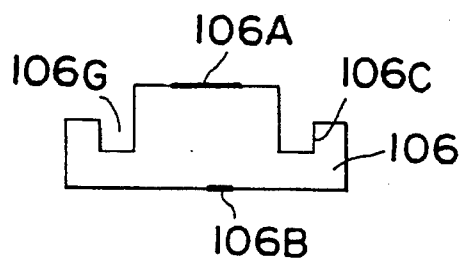
Figure 20:
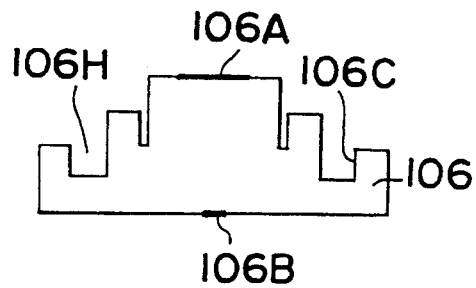

Also, a major portion (the body) of the diffraction element 106 generally bound by and between the diffraction grating 106B and the hologram 106A can have a greater thickness than another portion of the diffraction element as shown in any one of FIGS. 18 to 20, the surface of the major portion of the diffraction element 106 where the diffraction grating 106B is integrally formed remaining flush with an adjoining surface of the remaining portion of the diffraction element 106.

Figure 21:
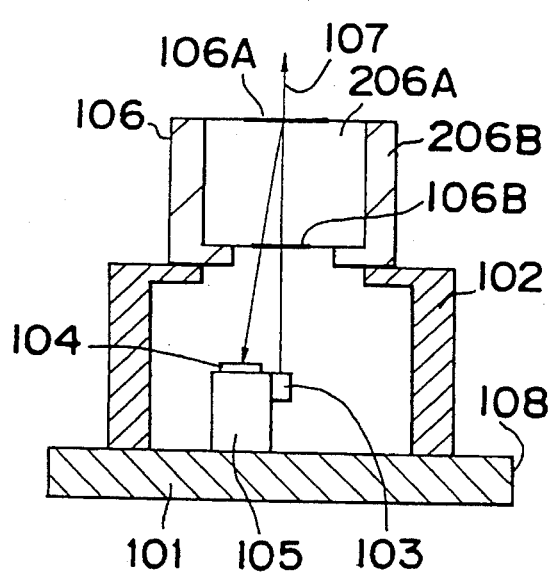
FIG. 21 is a schematic sectional view of a fourth preferred embodiment of the optical pick-up assembly according to the present invention.

Referring now to FIG. 21 showing the optical pick-up assembly according to a fourth preferred embodiment of the present invention, the light source 103 and the light receiving element 104 are fixedly mounted on the base 105 which is in turn fixedly mounted on the support disc 101. The covering 102 for enclosing an assembly of the base 105 with the light source 103 and the light receiving element 104 is fixedly mounted on the support disc 101.

The diffraction element 106 shown in FIG. 21 comprises a diffraction body 206A, which is in the form of the unitary block of glass or plastics having its opposite surfaces formed integrally with the diffraction grating 106B and the hologram 106A in alignment with each other, respectively, and an outer frame 206B having a chamber defined therein of a shape substantially identical with the outer contour of the diffraction body 206A and accommodating therein the diffraction body 206A substantially completely. This diffraction element 106 is fixedly mounted atop the covering 102 with the respective centers of the diffraction grating 106B and the hologram 106A aligned axially with the light source 103. As is the case with any one of the foregoing embodiments, the axial alignment of the diffraction grating 106B with the hologram 106A can be accomplished during the formation of the unitary block of glass or plastics with the use of mating dies.

The outer frame 206B, surrounding the diffraction body 106A to form the diffraction element 106 as shown in FIG. 21, is made of plastics and, therefore, the chamber in the outer frame 206B for enclosing the diffraction body 206A can be precisely and accurately formed depending on the precision of a mandrel used to form such chamber during the molding of the outer frame 206B. Because of this, the center of the outer contour of the diffraction body 206A can easily be matched with that of the outer frame 206B and, hence, the longitudinal axis of the diffraction body 206A can easily be matched with that of the outer frame 206B. The diffraction body 206A and the outer frame 206B are, of course, made separately.

The use of the outer frame 206B is effective to permit the use of the diffraction body 206A of a substantially reduced size and, therefore, the cost required to manufacture the diffraction body 206A can advantageously be minimized.

Figure 22:
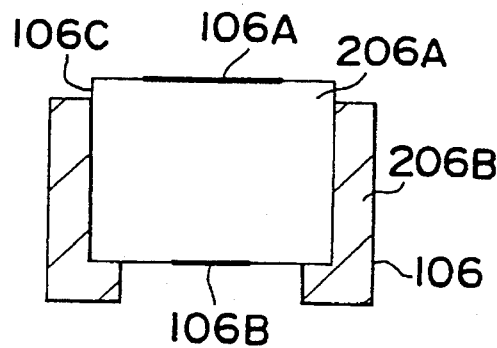
FIG. 22 is a schematic view partially in section, of the diffraction element according to the present invention.
Figure 23:
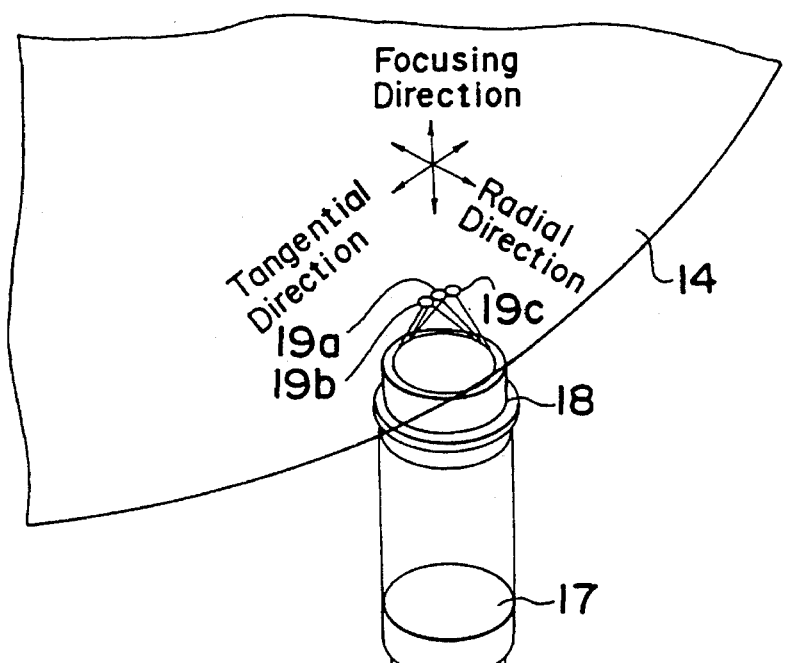
FIG. 23 is a schematic diagram of an optical system employing the prior art optical pick-up assembly.
Figure 24:
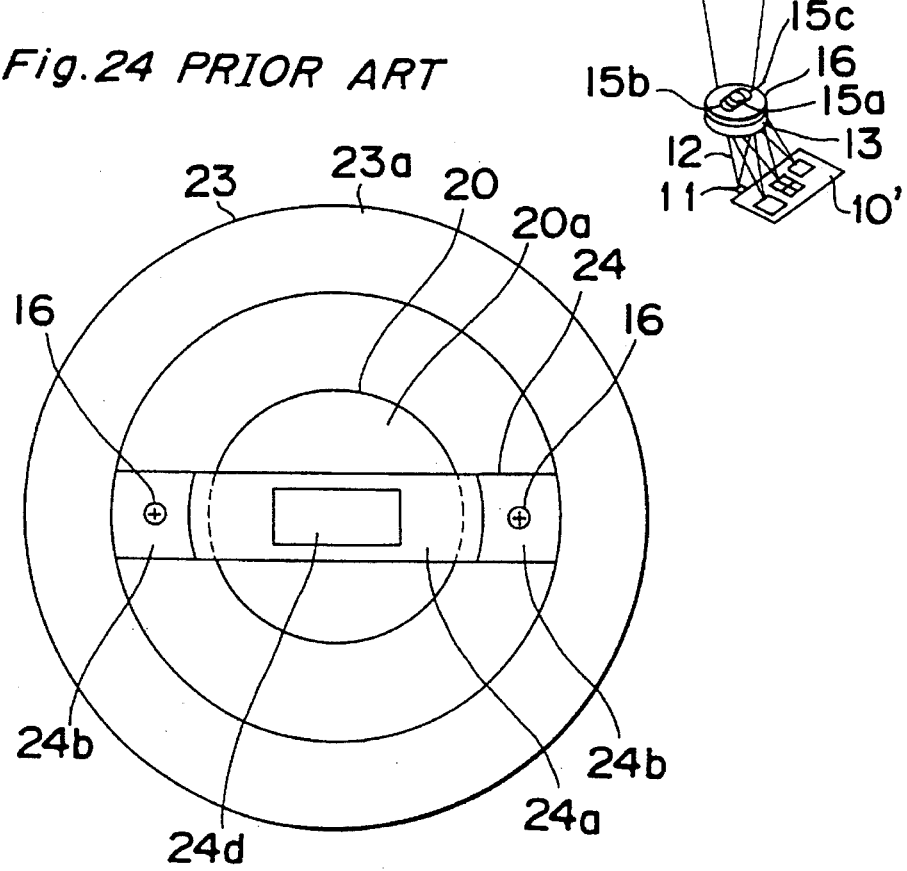
FIG. 24 is a bottom plan view of the prior art optical pick-up assembly.
Figure 25:
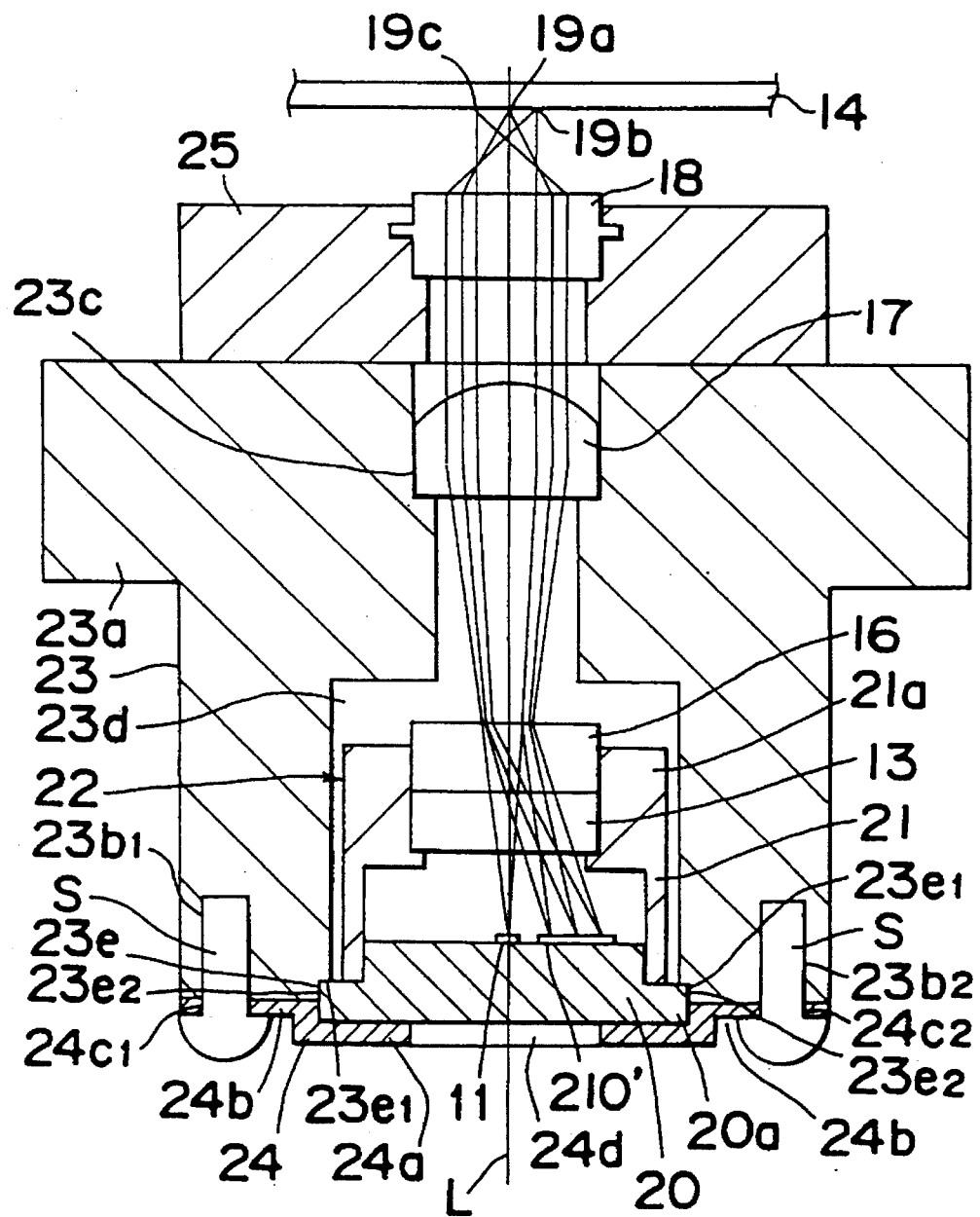
FIG. 25 is a longitudinal sectional view of the prior art pick-up assembly.

So far shown in FIG. 21, the outer frame 206B serves the slide. However, if the chamber in the outer frame 206B is undersized relative to the size of the diffraction body 206A so that one end portion of the diffraction body 206A protrudes a slight distance outwardly from the outer frame 206B as shown in FIG. 22, a peripheral portion of that end portion of the diffraction body 206A may be used as the slide.

The optical pick-up assembly according to the fourth embodiment of the present invention functions in a manner substantially similar to that according to any one of the foregoing embodiments and, therefore, the details thereof are not reiterated for the sake of brevity. However, in the practice of the fourth embodiment of the present invention, although the covering for enclosing the light source and the light receiving element is shown as a member separate from the outer frame in FIG. 21, the covering may be integrally formed with the outer frame. Also, means for absorbing the strain which has been described in connection with the third preferred embodiment of the present invention may effectively be employed in the fourth preferred embodiment of the present invention.

From the foregoing description, according to the present invention, the diffraction grating, the hologram and the slide (to be rotated for the adjustment of the tracking error signal) are integrated together to provide a unitary diffraction element, or, after a unitary diffraction block, in which the diffraction grating and the hologram are integrally formed, and the outer frame have been formed separately, they are integrated together to provide the diffraction element. In the latter case, at least a portion of the diffraction element serves as the slide. For this reason, not only can the component parts forming the optical pick-up assembly be precisely and accurately positioned relative to each other during assembly, but the assembly can readily be manufactured at a substantially reduced cost to provide the optical pick-up assembly which does not result in an optical misalignment even when the tracking error adjustment is effected.

Also, since the number of the component parts is few, the optical pick-up assembly according to the present invention can be compact.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they otherwise depart therefrom.

What is claimed is:

1. A diffraction element comprising:

a light splitting means for dividing a beam of light propagating in a predetermined direction along an optical path and incident thereon into a principal light beam and at least two auxiliary light beams;

a light separating means for displacing the light propagating along the optical path and incident thereon from the optical path;

a one-piece block of material transparent to the light, said one-piece block having a main body including opposite portions in which said light splitting means and said light separating means are formed in alignment with one another along an optical axis coincident with the optical path, and at least one projection extending from the main body, said at least one projection including a peripheral wall, at least portions of the surface of the peripheral wall being coincident with a circle coaxial with the optical axis along which the light splitting means and light separating means are aligned such that the peripheral wall will slide along and guide the diffraction element when rotated against a cylindrical surface of a diameter substantially the same as that of the circle.

2. A diffraction element comprising:

a light splitting means for dividing a beam of light propagating in a predetermined direction along an optical path and incident thereon into a principal light beam and at least two auxiliary light beams;

a light separating means for displacing the light propagating along the optical path and incident thereon from the optical path;

a one-piece block of material transparent to the light, said one-piece block having opposite portions in which said light splitting means and said light separating means are formed in alignment with one another along an optical axis coincident with the optical path; and a portion in which at least one recess extends, said portion having a respective peripheral wall delimiting each said at least one recess, at least portions of the surface of the peripheral wall being coincident with a circle coaxial with the optical axis along which the light splitting means and light separating means are aligned such that the peripheral wall will slide along and guide the diffraction element when rotated against a cylindrical surface of a diameter substantially the same as that of the circle.

3. A diffraction element comprising:

a light splitting means for dividing a beam of light propagating in a predetermined direction along an optical path and incident thereon into a principal light beam and at least two auxiliary light beams;

a light separating means for displacing a beam of the light propagating along the optical path and incident thereon from the optical path;

a one-piece block of material transparent to the light, said one-piece block having a main body including opposite portions in which said light splitting means and said light separating means are formed in alignment with one another along an optical axis coincident with the optical path;

an outer plastic frame in which said block is disposed, said outer plastic frame and said block being integrated; and at least one projection extending axially from the main body of said block in a direction parallel to said optical axis, said at least one projection including a peripheral wall integral with the main body of said block, at least portions of the surface of the peripheral wall being coincident with a circle coaxial with the optical axis along which the light splitting means and light separating means are aligned such that the peripheral wall will slide along and guide the diffraction element when rotated against a cylindrical surface of a diameter substantially the same as that of the circle.

4. A diffraction element comprising:

a light splitting means for dividing a beam of light propagating in a predetermined direction along an optical path and incident thereon into a principal light beam and at least two auxiliary light beams;

a light separating means for displacing the light propagating along the optical path and incident thereon from the optical path;

a one-piece block of material transparent to the light, said one-piece block having opposite portions in which said light splitting means and said light separating means are formed in alignment with one another along an optical axis coincident with the optical path;

an outer plastic frame in which said block is disposed, said outer plastic frame and said block being integrated; and a portion in which at least one recess extends integral with said light splitting means and said light separating means, said portion having a respective peripheral wall delimiting each said at least one recess, at least portions of the peripheral wall being coincident with a circle coaxial with the optical axis along which the light splitting means and light separating means are aligned such that the peripheral wall will slide along and guide the diffraction element when rotated against a cylindrical surface of a diameter substantially the same as that of the circle.

5. An optical pick-up assembly comprising:

a light source which emits a beam of light along a predetermined optical path;

a light splitting means for dividing the light beam emitted by the light source into a principal light beam and at least two auxiliary light beams;

means for converging the principal light beam and the at least two auxiliary light beams such that the principal light beam and the at least two auxiliary light beams can be focused onto an optical information recording medium at respective locations;

a light separating means for displacing the light emitted by the light source, travelling along the optical path and incident thereon from the optical path;

a light receptor oriented to receive a beam of light separated from the optical path by said light separating means;

a one-piece block of material transparent to the light emitted from the light source, said one-piece block having opposite portions in which said light splitting means and said light separating means are formed in alignment with one another along an optical axis coincident with the optical path, and said one-piece block of material having a peripheral wall, at least portions of the surface of said peripheral wall being coincident with a circle; and a carrier having a cylindrical surface coaxial with the optical axis along which the light splitting means and light separating means are aligned and having a diameter substantially the same as that of said circle, the peripheral wall being slidingly engaged with the cylindrical surface of said carrier so as to guide said block for rotation relative to the cylindrical surface of said carrier.

6. An optical pick-up assembly comprising:

a light source which emits a beam of light along a predetermined optical path;

a light splitting means for dividing the light beam emitted by the light source into a principal light beam and at least two auxiliary light beams;

means for converging the principal light beam and the at least two auxiliary light beams such that the principal light beam and the at least two auxiliary light beams can be focused onto an optical information recording medium at respective locations;

a light separating means for displacing the light emitted by the light source, travelling along the optical path and incident thereon from the optical path;

a light receptor oriented to receive a beam of light separated from the optical path by said light separating means;

a one-piece block of material transparent to the light emitted from the light source, said one-piece block having a main body including opposite portions in which said light splitting means and said light separating means are formed in alignment with one another along an optical axis coincident with the optical path, and at least one projection extending from the main body of said block, said at least one projection including a peripheral wall, at least portions of the surface of the wall being coincident with a circle; and a carrier having a cylindrical surface coaxial with the optical axis along which the light splitting means and light separating means are aligned and having a diameter substantially the same as that of said circle, the peripheral wall being slidingly engaged with the cylindrical surface of said carrier so as to guide said block for rotation relative to the cylindrical surface of said carrier.

7. An optical pick-up assembly comprising:

a light source which emits a beam of light along a predetermined optical path;

a light splitting means for dividing the light beam emitted by the light source into a principal light beam and at least two auxiliary light beams;

means for converging the principal light beam and the at least two auxiliary light beams such that the principal light beam and the at least two auxiliary light beams can be focused onto an optical information recording medium at respective locations;

a light separating means for displacing the light emitted by the light source, travelling along the optical path and incident thereon from the optical path;

a light receptor oriented to receive a beam of light separated from the optical path by said light separating means;

a one-piece block of material transparent to the light emitted from the light source, said one-piece block having opposite portions in which said light splitting means and said light separating means are formed in alignment with one another along an optical axis coincident with the optical path; and a portion in which at least one recess extends integral with said light splitting means and said light separating means, said portion having a respective peripheral wall delimiting each said at least one recess, at least the peripheral surface of the wall being coincident with a circle; and a carrier having a cylindrical surface coaxial with the optical axis along which the light splitting means and light separating means are aligned and having a diameter substantially the same as that of said circle, the peripheral wall being slidingly engaged with the cylindrical surface of said carrier so as to guide said block for rotation relative to the cylindrical surface of said carrier.

8. An optical pick-up assembly comprising:

a light source which emits a beam of light along a predetermined optical path;

a light splitting means for dividing the light beam emitted by the light source into a principal light beam and at least two auxiliary light beams;

means for converging the principal light beam and the at least two auxiliary light beams such that the principal light beam and the at least two auxiliary light beams can be focused onto an optical information recording medium at respective locations;

a light separating means for displacing the light emitted by the light source, travelling along the optical path and incident thereon from the optical path;

a light receptor oriented to receive a beam of light separated from the optical path by said light separating means;

a one-piece block of material transparent to the light emitted from the light source, said one-piece block having a main body including opposite portions in which said light splitting means and said light separating means are formed in alignment with one another along an optical axis coincident with the optical path; and an outer plastic frame in which said block is disposed, said outer plastic frame and said block being integrated; and at least one projection extending axially from the main body of said block in a direction parallel to said optical axis, said at least one projection including a peripheral wall integral with the main body of said block, at least portions of the surface of the wall being coincident with a circle; and a carrier having a cylindrical surface coaxial with the optical axis along which the light splitting means and light separating means are aligned and having a diameter substantially the same as that of said circle, the peripheral wall being slidingly engaged with the cylindrical surface of said carrier so as to guide said block for rotation relative to the cylindrical surface of said carrier.

9. An optical pick-up assembly comprising:

a light source which emits a beam of light along a predetermined optical path;

a light splitting means for dividing the light beam emitted by the light source into a principal light beam and at least two auxiliary light beams;

means for converging the principal light beam and the at least two auxiliary light beams such that the principal light beam and the at least two auxiliary light beams can be focused onto an optical information recording medium at respective locations;

a light separating means for displacing the light emitted by the light source, travelling along the optical path and incident thereon from the optical path;

a light receptor oriented to receive a beam of light separated from the optical path by said light separating means;

a one-piece block of material transparent to the light emitted from the light source, said one-piece block having opposite portions in which said light splitting means and said light separating means are formed in alignment with one another along an optical axis coincident with the optical path;

an outer plastic frame in which said block is disposed, said outer plastic frame and said block being integrated; and a portion in which at least one recess extends and integral with said light splitting means and said light separating means, said portion having a respective peripheral wall delimiting each said at least one recess, at least of the surface of the peripheral wall being coincident with a circle; and a carrier having a cylindrical surface coaxial with the optical axis along which the light splitting means and light separating means are aligned and having a diameter substantially the same as that of said circle, the peripheral wall being slidingly engaged with the cylindrical surface of said carrier so as to guide said block for rotation relative to the cylindrical surface of said carrier.

* * * * *

UNITED STATES PATENT AND TRADEMARK OFFICE
CERTIFICATE OF CORRECTION

PATENT NO. : 5,481,524
DATED : January 2, 1996
INVENTOR(S) : Akira UENO et al.

It is certified that error appears in the above-indentified patent and that said Letters Patent is hereby corrected as shown below:

On the Title page, item [73];

change "Company" to --Corporation--.

Signed and Sealed this

Second Day of April, 1996

Attest:

BRUCE LEHMAN

*Attesting Officer*      *Commissioner of Patents and Trademarks*